US006891824B1

(12) United States Patent
Gordon

(10) Patent No.: US 6,891,824 B1
(45) Date of Patent: May 10, 2005

(54) AUDIBLE COMMUNICATION WITH A MODEM OVER A WIDE AREA NETWORK

(75) Inventor: Scott B. Gordon, Upton, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 08/885,698

(22) Filed: Jun. 30, 1997

(51) Int. Cl.[7] .............................................. H04L 12/66
(52) U.S. Cl. ..................................... 370/352; 379/900
(58) Field of Search ................................. 370/351–356, 370/400–402, 493, 496, 495, 389, 463, 465, 466; 379/88.17, 900, 93.05, 93.06, 93.07, 93.08, 93.28, 93.14

(56) References Cited

U.S. PATENT DOCUMENTS

| | | | |
|---|---|---|---|
| 4,528,659 A | | 7/1985 | Jones, Jr. |
| 5,317,568 A | | 5/1994 | Bixby et al. |
| 5,428,608 A | | 6/1995 | Freeman et al. |
| 5,546,379 A | | 8/1996 | Thaweethai et al. |
| 5,602,846 A | | 2/1997 | Holmquist et al. |
| 5,604,737 A | * | 2/1997 | Iwami et al. ................. 370/352 |
| 5,608,786 A | | 3/1997 | Gordon |
| 5,610,910 A | * | 3/1997 | Focsaneanu et al. ......... 370/351 |
| 5,751,706 A | * | 5/1998 | Land et al. ................... 370/352 |
| 5,761,294 A | * | 6/1998 | Shaffer et al. ............... 370/466 |
| 5,867,494 A | * | 2/1999 | Krishnaswamy et al. .... 370/352 |
| 5,912,888 A | * | 6/1999 | Walsh .......................... 370/355 |
| 5,940,479 A | * | 8/1999 | Guy ............................. 370/410 |
| 5,940,596 A | * | 8/1999 | Strauss et al. ............... 370/466 |
| 5,974,043 A | * | 10/1999 | Solomon ...................... 370/352 |
| 5,991,291 A | * | 11/1999 | Asai ............................. 370/352 |
| 5,991,292 A | * | 11/1999 | Focsaneanu et al. ......... 370/352 |
| 6,014,431 A | * | 1/2000 | McHale ...................... 379/93.14 |
| 6,064,673 A | * | 5/2000 | Anderson et al. ............ 370/389 |
| 6,067,350 A | * | 5/2000 | Gordon ........................ 370/352 |
| 6,122,255 A | * | 9/2000 | Bartholomew .............. 370/352 |
| 6,173,044 B1 | * | 1/2001 | Hortensius et al. ......... 379/93.14 |
| 6,240,084 B1 | * | 5/2001 | Oran et al. ................... 370/352 |
| 6,320,857 B1 | * | 11/2001 | Tonnby et al. .............. 370/352 |
| 6,600,733 B2 | * | 7/2003 | Deng ........................... 370/352 |

FOREIGN PATENT DOCUMENTS

WO    WO9716916    *  5/1997   ............ H04M/9/06

OTHER PUBLICATIONS

Huang, Hybrid Packet switched and circuit switched telephony system, PCT WO 97/23078 Page, Jun. 26, 1997.*
Jonas, method and apparatus for transmitting and routing voice telephone calls over a packet switched computer network, PCT wo/97/14238, Apr. 17, 1997.*

* cited by examiner

Primary Examiner—Steven Nguyen
(74) Attorney, Agent, or Firm—Brian L. Michaelis; Brown Rudnick LLP

(57) ABSTRACT

A method and apparatus for effecting low cost audible communication between a local machine at a local site and a remote modem, over a wide area network. A remote modem, e.g. in a modem pool is configured to include a converter added to a telephone interconnection of a modem in the modem pool. As the remote modem receives communication(s) from the local machine the signal generated by the modem onto a local phone line for communication with the remote computer, is split and the converter receives the signal (heading to or from a WAN) from the telephone side of the modem. The converter provides an audio output that is input to sound processing hardware on an interface PC that runs an audio streaming program which packetizes and puts the audio signal back onto the WAN for transmission to the local computer. The local computer, suitably equipped with sound processing hardware and a similar audio streaming program receives the audio from the remote modem communication and can "play" it as continuous time-based audio. In this manner, one can listen to the exchange of signals between the remote modem and the local computer, over the WAN and at the local computer.

19 Claims, 2 Drawing Sheets

AUDIBLE COMMUNICATION WITH A MODEM OVER A WIDE AREA NETWORK

FIELD OF THE INVENTION

The present invention relates to modems in a modem pool, and more particularly to a method and apparatus implementing communication with a modem over a wide area network.

BACKGROUND OF THE INVENTION

Modems are well known and have been in use for some time to transmit digital information over distributed wide area networks. Typical modems transform a two level, i.e. digital, computer signal into a form suitable for transmission over the public switched telephone network. Rather than sending binary information from the computer, circuitry in a sending modem (i.e. MOdulation circuitry) converts the binary information into signals, e.g. pulse tones, suitable for transmission over the telephone network. A typical modem also includes circuitry (i.e. DEModulation circuitry) for receiving transmissions sent to it over the telephone network and converting them back to digital data suitable to pass to a destination computer. Modems known in the art typically do not have any capability to transmit voice information over the telephone network. That is, modems can not be used to talk over the telephone network, and typically a separate connection initiated telephonically is required to inquire in a real-time, audible manner as to the status of a transmission sent via modem.

Remote "modem pools", comprised of a plurality of modems, are used in wide area systems communications, for communication between remote and local electronic systems, wherein the remote modem(s) and local computer system(s) are typically interconnected over a wide area network (WAN) such as Ethernet. The remote modem pool is typically located a significant distance from the local computer, and the remote modem is used by the local computer to dial up one or more remote computers in a locality that is a local telephone call from the remote modem(s). In this manner, long distance telephone charges are avoided between the local computer and the remote computer(s), as the WAN and remote modem pool are used to transmit information over the long distance between the local system and the remote modem(s).

The modem pool comprises a plurality of modems and an access server that supports the plurality of modems used for dialing into or out of computer facilities local to the remote modem(s). The access server in effect provides routing and translation capabilities between the WAN and one or more of the plurality of modems in the modem pool. Accordingly, a local computer connected to the WAN can access modems in the modem pool via the access server.

In a typical modem pool configuration, a local computer (such as at a service facility) may be available to receive communications, such as status or error information, from one or more remote systems. For example, the remote computer would issue a status information file or packet out onto the Ethernet directed to the local computer. The status information packet from the remote system is communicated, typically in a local telephone call via a resident modem in the remote system(s), to a remote modem in the modem pool. The remote modem provides the status information packet to the access server which effects translation of the information into packet(s) formed in accordance with the WAN protocol (e.g. Ethernet) for transmission over the WAN, as known in the art. Upon receipt of the information from the remote computer, an operator at the local computer may need to effect return communication with the remote computer, such as by sending out a return file. With the local computer located significant distances from the modem(s) in the modem pool, it is not possible to monitor or listen to the transmission to or from the remote modem pool. The operator typically relies on text messages received at the local system that indicate the status of the communications. In some cases, the local machine may be returning a communication that will be received at the remote site through an automated attendant that requires specific instructions that must be followed. The local user will not be able to listen to communications from such automated attendants, even though the remotely located modems have facilities (i.e. speakers) for listening to the transmissions. Additionally, the operator at the local machine may wish to have verbal/audio communication with the remote site, for example to speak with an operator at the remote site. Such audio communication is generally carried out over a telephone, at long distance rates or charges applicable for phone communication between the remote and local sites.

Disadvantageously, in known remote modem pools using known access servers, there is no mechanism for listening at a local site, to a transmission over the WAN of communication between the local machine and the remote modem. That is, modems in a modem pool do not have capabilities for transmitting an audible transmission signal back over the WAN to be listened to at the local site. Similarly, modems in known remote modem pools do not provide facilities for effecting an audio transmission over the WAN in order to avoid having to incur the additional charges associated with a long distance telephone connection in addition to the modem-to-network communication between the local and remote sites.

SUMMARY OF THE INVENTION

The present invention provides a method and apparatus for effecting low cost audible communication between a local machine at a local site and a remote modem, over a wide area network.

According to the invention, a remote modem, e.g. in a modem pool, is configured to include a converter added to a telephone interconnection of the modem. As the remote modem receives communication(s) from the local machine, the signal generated by the modem onto a local phone line for communication with the remote computer is split and the converter receives the signal (heading to or from the WAN) from the telephone side of the modem. The converter, comprised of a telephone line interface, provides an audio output that is input to sound processing hardware, e.g. a soundcard, on an interface PC that runs an audio streaming program which packetizes and puts the audio signal back onto the WAN for transmission to the local computer. The local computer, suitably equipped with a soundcard and a similar audio streaming program receives the audio from the remote modem communication and can "play" it as continuous time-based audio. In this manner, one can listen to the exchange of signals between the remote modem and the local computer, over the WAN and at the local computer.

In one embodiment of the invention, the converter is configured so that a connection between the local computer and the remote modem initiated by the local machine can be kept open. In this manner, a telephone connected to the telephone side of the remote modem can be used to provide a telephone audio signal. The telephone audio signal is similarly split at the converter, which receives the telephone audio signal from the telephone side of the modem. The converter provides the telephone audio signal to the soundcard on the interface PC that runs the audio streaming program. The interface PC running the audio streaming program packetizes and puts the telephone audio signal onto the WAN for transmission to the local computer. The local computer, suitably equipped with the soundcard and the similar audio streaming program receives the audio from the telephone at the telephone side of the remote modem and can "play" it as continuous time-based audio. In this manner, one can listen to a telephone communication introduced at the telephone side of the remote modem, over the WAN and at the local computer without incurring long distance phone charges, as the phone call is routed over the WAN.

Features of the invention include a low cost implementation for effecting audible communication between a local machine at a local site and a remote modem, over a wide area network. Non-complex, low cost components are used in implementing audible communication with the remote modem. Significant cost savings accrue by using a telephone interconnection effecting transmissions over the WAN and avoiding long distance connect charges for telephone communication between the remote and local sites.

BRIEF DESCRIPTION OF THE DRAWING

The foregoing and other features and advantages of the present invention will be more fully understood from the following detailed description of illustrative embodiments, taken in conjunction with the accompanying drawing in which.

DETAILED DESCRIPTION

Figure 1:
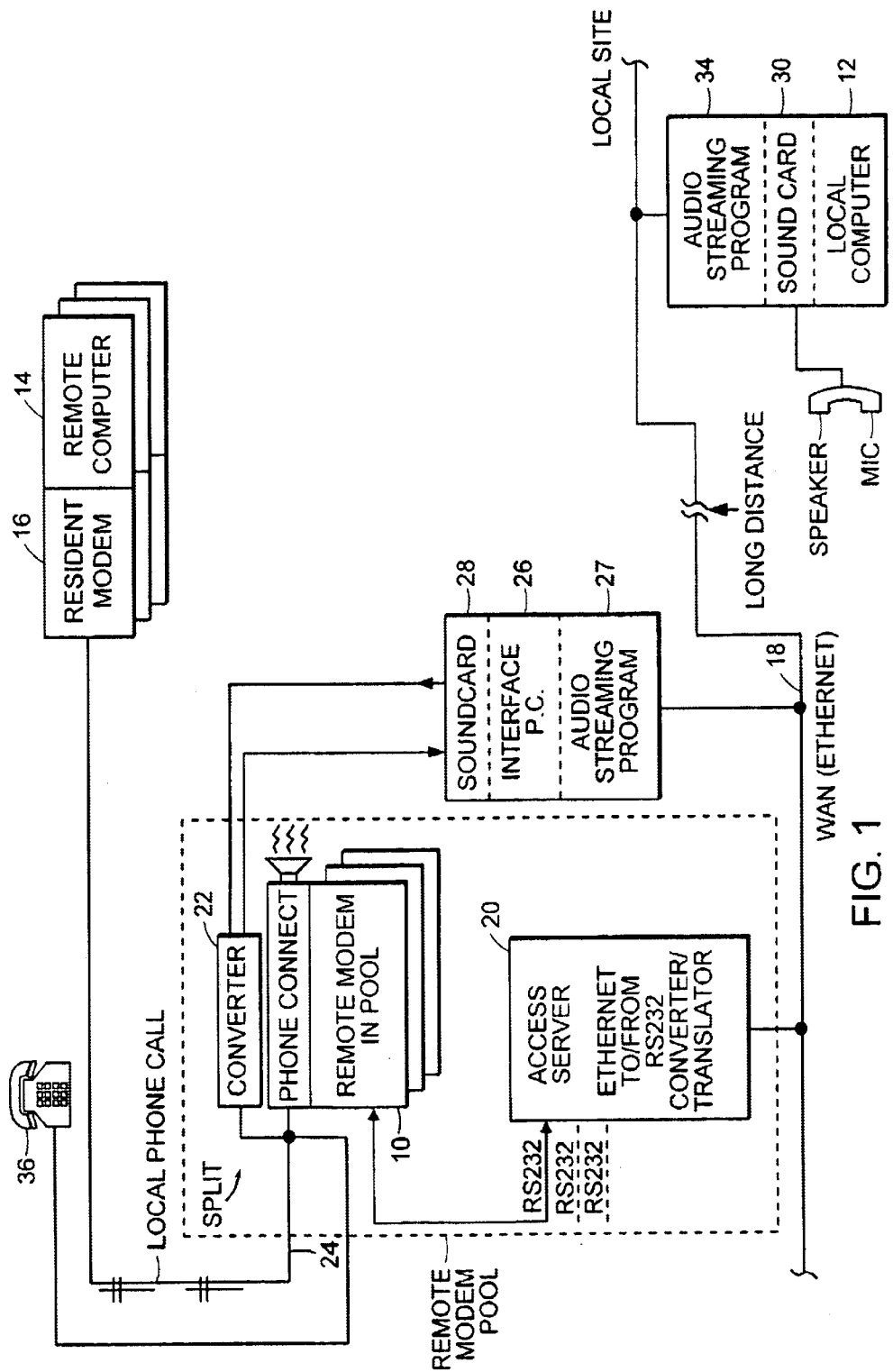
FIG. 1 is a block diagram of an embodiment implementing audible communication with a remote modem in a modem pool over a wide area network according to the invention.

A method and apparatus implementing audible communication with a remote modem over a wide area network, according to the invention, is illustrated in FIG. 1. The embodiment is implemented generally in the context of a remote modem pool, comprised of a plurality of modems 10. Each of the modems 10 in the pool is used in wide area systems communications, for communication between a local electronic system or computer 12 and a remote electronic or computer system 14 that includes a resident modem 16 to facilitate electronic communication therewith. The remote modem(s) 10 and the local computer system(s) 12 are interconnected over a wide area network (WAN) 18, such as Ethernet, via appropriate hardware as known in the art.

The remote modem 10 is typically located a significant distance from the local computer 12. The local computer 12 accesses the remote modem 10 via the WAN 18, and the remote modem is used by the local computer to dial up the resident modem 16 associated with the remote computer. The remote modem 10 is located in a locality that is a local telephone call to/from the remote computer 14 and its resident modem 16. In this manner, long distance telephone charges are avoided between the local computer and the remote computer, as the WAN and remote modem pool are used to transmit information over the long distance between the local and the remote systems.

The modem pool providing the context of the present invention generally comprises the plurality of modems 10 and an access server 20. The access server 20, such as a Cisco Systems Inc. 2500 Series Access Server known in the art, supports the plurality of remote modems in effect providing routing and translation capabilities between the WAN 18 and one or more of the plurality of modems 10 in the modem pool. Accordingly, the local computer 12 connected to the WAN 18 accesses modems 10 in the modem pool via the access server 20, which is described in detail in the CiscoPro CPA 2509 and CPA 2511 Access Server User Guide which is hereby incorporated herein by reference.

According to the invention, at least one remote modem in the pool is configured to include a converter 22 added to a telephone interconnection on the modem as known in the art. The converter 22 is a Telephone Line Interface, such as a TCA3388 made by Motorola and described in detail in the Motorola Master Selection Guide (Analog and Interface Integrated Circuits), pertinent portions of which are incorporated herein by reference. The converter 22, among other things, provides impedance matching and effectively converts the signal taken off the telephone side of the remote modem 10 into an appropriated analog audio output signal for further processing, as described hereinafter. It should be appreciated that each modem in the modem pool with which audible communication is desired, must have a respective converter 22 configured as described herein to effect audible communication.

As the remote modem 10 receives communication(s) from the local machine 12, via the access server 20, the signal generated by the modem onto a local phone line 24 for communication with the remote computer 14, is split and the converter 22 receives the signal (heading to or from the WAN) from the telephone side of the remote modem 10. The converter 22 converts the telephone network transmission signal and provides an electrical audio output signal that is input to an interface computer or PC 26. The interface PC 26, such as an IBM Personal Computer or compatible, is equipped with a soundcard 28, as known in the art, that receives the audio output signal from the converter 22 (for communications going to the remote computer).

The interface PC 26 receives the audio output signal and prepares it for transmission over the WAN back to the local computer 12. The interface PC 26 runs an audio streaming program 27, such as Real Audio by Progressive Networks, which packetizes and puts the audio signal onto the WAN for transmission to the local computer 12. The local computer 12 suitably equipped with its own soundcard 30 receives from the WAN the packetized audio from the communication to the remote modem 10. The local computer 12 is configured with a similar audio streaming program 34 that de-packetizes the audio communication received over the WAN and can "play" it as continuous time-based audio. In this manner, one can listen to the exchange of signals from the local computer 12 to the remote modem 10, over the WAN and at the local computer 12 listening station.

The converter 22 is additionally configured so that the connection such as described between the local computer 12 and the remote modem 10, initiated by the local machine 12, can be kept open by making a connection to a remote phone instead of a remote modem. That is, a telephone 36, as known in the art, in this embodiment is connected to the converter 22 at the telephone side of the remote modem 10. Such a connection can be made via a splitter as known in the art. The telephone 36 can be used to provide a telephone audio signal generated by someone speaking into the telephone 36. The telephone audio signal is provided to the converter 22, which in turn provides the converted audio signal to the soundcard 28 on the interface PC 26 that runs the audio streaming program 27 for transmission of the audio signal over the WAN. The interface PC 26 running the audio streaming program 27 packetizes and puts the telephone audio signal onto the WAN for transmission to the local computer 12. The local computer 12, suitably equipped with the soundcard 30 and the similar audio streaming program 34 receives the telephone audio signal from the telephone 36 at the telephone side of the remote modem and can "play" it as continuous time-based audio. In this manner, one can listen to a telephone communication introduced at the telephone side of the remote modem, over the WAN and at the local computer without incurring long distance phone charges (as the phone call is routed over the WAN).

Similarly, the local machine 12, with appropriate audio capabilities, i.e. a microphone, can undertake audio communication with the remote phone 36 over the WAN by dialing the remote phone 36 (instead of the remote modem). Such audio communication between the local computer and the remote phone 36 would be effected as a local call.

Although the system as described herein involves configuring a remote modem in a modem pool to make, local calls to remote computer systems with resident modems, it will be appreciated that the remote modem/pool can be configured to communicate with other automated systems that incorporate intelligence to gather status information and communicate it over a WAN, such as arrays of storage devices including disk drives, security systems and other systems having system performance monitoring capabilities.

Figure 2:
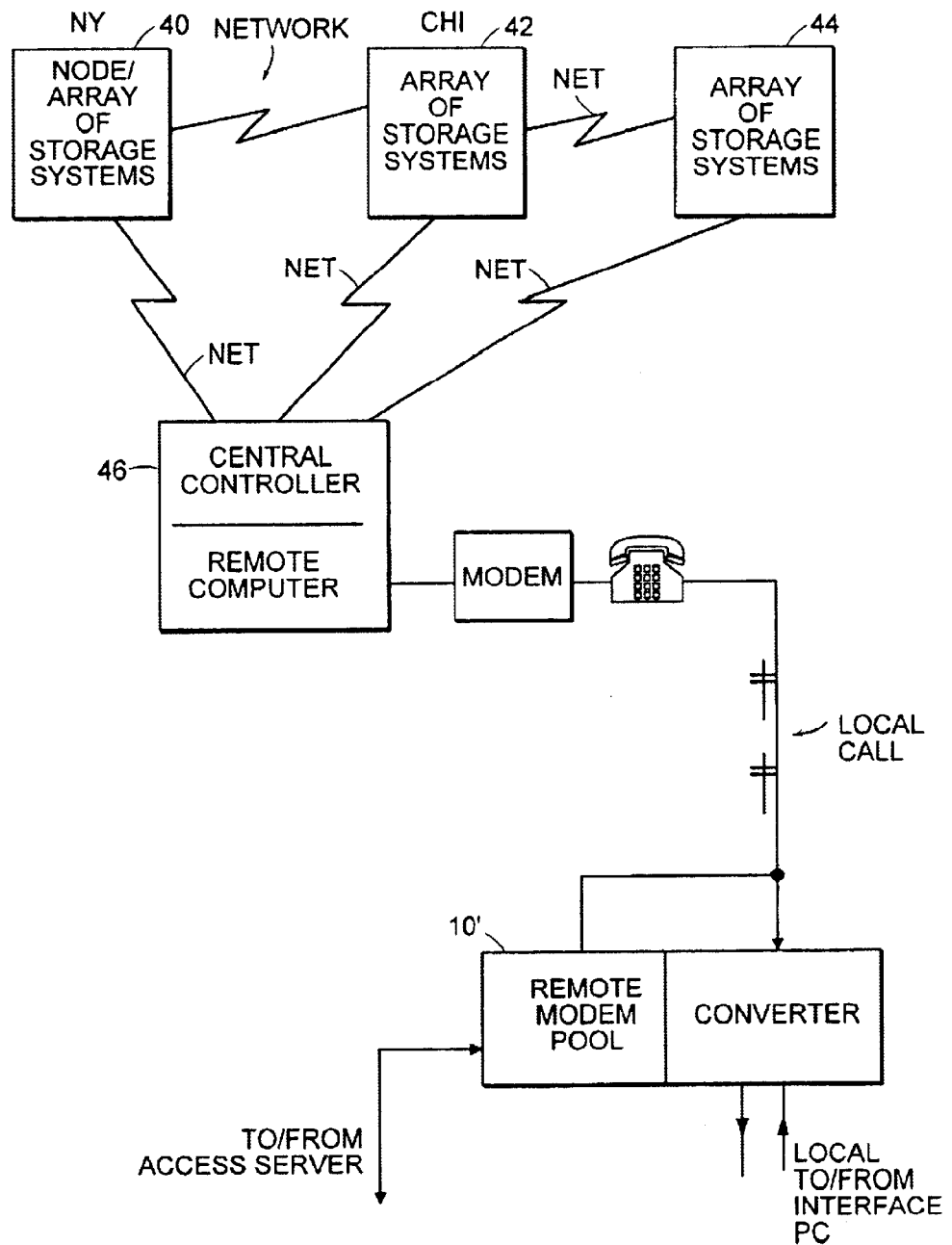
FIG. 2 is a block diagram of an embodiment implementing audible communication with a remote modem, according to the invention, in a networked storage device monitoring system.

For example, in a networked storage device monitoring system as generally illustrated in FIG. 2, a plurality of storage devices include intelligence that is provided in the form of microcomputers or processors analogous to the "remote computer(s)" as described hereinabove. The plurality of storage devices may be constituted by a first plurality of storage devices 40 located in one remote location networked to other: pluralities of storage devices 42, 44 located in other remote locations. A central control computer 46 acts as a central remote computer effecting a "clearinghouse" or server for status information that it receives from the various distributed nodes. In such an embodiment, the central controller/remote computer provides a measure of security (as in a "firewall") in that it isolates the various nodes/ storage arrays from direct communication with the modem pool 10'. Nonetheless, the system is configured so that it is a "local call" from the remote modem pool 10' to the central controller/remote computer 46. A configuration as described hereinbefore with respect to FIG. 1, provides the ability to listen to communication and effect telephone communication at the telephone side of the remote modem 10', over the WAN and to/from the local computer. Such communication can be effected without: incurring long distance phone charges, which provides a substantial cost saving.

Although the embodiment(s) described hereinbefore involve modem "pools" and incorporate an access server in the form of Cisco Systems Inc. 2500 Series Access Server known in the art, it should be appreciated that the configuration described can be implemented in the context of a single remote modem, as opposed to a modem pool comprising a plurality of modems, and further that alternative access servers can be implemented in modem pool contexts, such as access servers or the like available from 3COM, Bay Networks, Cabletron Systems or others.

While an "off-the-shelf" audio streaming program, i.e. Real Audio by Progressive Networks, is described in the illustrative embodiment of the invention described herein, it will be appreciated that other programs and/or facilities can be implemented to packetize and put audio signals onto the WAN for transmission to the local computer, such as other off-the-shelf continuous time based audio streaming programs, dedicated audio streaming programs or the like.

Although the illustrative embodiment described herein incorporates a converter in the form of a particular Telephone Line Interface device providing impedance matching and converting the signal taken off the telephone side of the remote modem into an appropriate signal for transmission to a soundcard in the interface PC, it should be appreciated that other means can be implemented for conditioning the telephone audio signal for receipt by the PC hardware, such as a modified microphone and line plug in transformer or the like.

Although the invention has been shown and described with respect to exemplary embodiments thereof, various other changes, omissions and additions in the form and detail thereof may be made therein without departing from the spirit and scope of the invention.

What is claimed is:

1. An apparatus for effecting audible communication between a local system and a remote system over a Wide Area Network (WAN), comprising:

a remote modem configured in said remote system and receiving telephone transmission signals;

a converter electrically interconnected to a telephone interconnection of said remote modem and splitting a portion of said telephone transmission signals therefrom and providing an audio output signal;

an interface machine receiving said audio output signal from said converter, said interface machine including a first sound processing mechanism processing said audio output signal for transmission over said WAN as a network audio signal;

a second sound processing mechanism configured at said local system, receiving said network audio signal and processing said network audio signal to provide a continuous audio signal at said local system.

2. The apparatus of claim 1 wherein said second sound processing mechanism is a sound card running on said local system and configured to run an audio streaming program.

3. The apparatus of claim 1 wherein said interface machine is a personal computer.

4. The apparatus of claim 3 wherein said first sound processing mechanism is a sound card configured to run an audio streaming program and configured to transmit said network audio signal in the form of packets addressed only to said second sound processing mechanism.

5. The apparatus of claim 1 wherein said remote modem is configured to communicate with automated systems that incorporate intelligence to gather status information.

6. A method for effecting audible communication between a local system and a remote system over a Wide Area Network (WAN), comprising the steps of:

configuring a remote communication mechanism in said remote system to receive a transmission signal;

converting said transmission signal into an analog audio output signal, wherein said converting involves a converter electrically connected to an interconnection of said remote communication mechanism to receive said transmission signals therefrom and to convert said transmission signals into said analog audio output;

processing said analog audio output signal into packets for transmission over said WAN as a stream of audio packets;

receiving and processing said stream of audio packets to provide a continuous audio signal at said local system.

7. The method of claim 6 in which said remote communication mechanism is configured to communicate with automated systems that incorporate intelligence to gather status information and such status information is transmitted to said remote communication mechanism as a transmission signal.

8. The method of claim 6 wherein the transmission signal received by said remote communication mechanism is generated by a remote modem resident with a remote computer system.

9. The method of claim 6 wherein said processing step involves an interface machine configured to receive said analog audio output signal from said converter.

10. The method of claim 9 wherein said interface machine is a personal computer.

11. The method of claim 6 wherein said processing step involves a first sound processing mechanism used to process said analog audio output signal.

12. The method of claim 6 wherein said receiving step involves a second sound processing mechanism used to process said stream of packets.

13. The method of claim 11 wherein said first sound processing mechanism is a sound card configured to run an audio streaming program.

14. The method of claim 12 wherein said second sound processing mechanism is a sound card configured to run an audio streaming program.

15. An apparatus for communicating audio signals between a telephone interface of a remote modem and a listening station via a packet network comprising:

a signal converter electrically connected to a telephone interface of said remote modem and electrically converting between a telephone signal and an electrical audio signal;

an interface machine, electrically connected with said converter, for processing said electrical audio signal to generate a transmitted stream of audio data packets and transmitting said stream into a packet network, and for receiving an output stream of audio data from said packet network, and for processing said output stream into an electrical audio signal to said signal converter;

a listening station for receiving said transmitted stream of audio data packets via said packet network and processing said transmitted stream to generate a continuous output audio signal, and for receiving an audio input signal and processing said signal to generate said output stream of audio data packets, and for transmitting said output stream into a packet network;

whereby an operator at said listening station can listen to the telephone signals of said remote modem and can generate audio signals to be converted into remote telephone signals, without having an electrical audio path from the remote modem to the operator location.

16. The apparatus of claim 15 in which said signal converter is a telephone line interface for providing impedance matching and voltage conversion between said telephone signal and an audio input and audio output of said interface machine.

17. The apparatus of claim 15 in which said interface machine further comprises a personal computer having a soundcard and running an audio streaming program and in which said listening station is a computer running a streaming audio program and having a soundcard electrically connected to a loudspeaker.

18. The apparatus of claim 17 in which said soundcard in said listening station further includes a microphone interface.

19. The apparatus of claim 15 in which said packet network further comprises an Ethernet connection, and said transmitted stream is addressed only to the listening station and said output stream is addressed only to the interface machine.

* * * * *